(12) United States Patent
Kazumi

(10) Patent No.: US 11,876,400 B2
(45) Date of Patent: Jan. 16, 2024

(54) BACKUP POWER-SUPPLY DEVICE

(71) Applicant: Yazaki Corporation, Tokyo (JP)

(72) Inventor: Kenji Kazumi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/872,238

(22) Filed: Jul. 25, 2022

(65) Prior Publication Data

US 2023/0027426 A1 Jan. 26, 2023

(30) Foreign Application Priority Data

Jul. 26, 2021 (JP) .................................. 2021-121843

(51) Int. Cl.
  *H02J 9/06* (2006.01)
  *H02J 7/34* (2006.01)
  *B60L 53/00* (2019.01)
  *B60L 50/40* (2019.01)
  *B60L 50/60* (2019.01)
  *B60L 1/00* (2006.01)

(52) U.S. Cl.
  CPC .............. *H02J 9/061* (2013.01); *B60L 50/40* (2019.02); *B60L 53/00* (2019.02); *H02J 7/345* (2013.01); *B60L 1/00* (2013.01); *B60L 50/60* (2019.02)

(58) Field of Classification Search
  None
  See application file for complete search history.

(56) References Cited

U.S. PATENT DOCUMENTS

| | | | |
|---|---|---|---|
| 2009/0174255 A1* | 7/2009 | Dahlberg | F02D 41/221 307/10.1 |
| 2019/0173311 A1* | 6/2019 | Kudo | H02J 7/345 |
| 2019/0379220 A1* | 12/2019 | Ueda | H02J 7/0031 |

FOREIGN PATENT DOCUMENTS

| | | |
|---|---|---|
| EP | 3 576 250 A1 | 12/2019 |
| JP | 2020-182317 A | 11/2020 |

* cited by examiner

*Primary Examiner* — Jared Fureman
*Assistant Examiner* — Aqeel H Bukhari
(74) *Attorney, Agent, or Firm* — Sughrue Mion, PLLC

(57) ABSTRACT

A backup power-supply device including a control unit is provided. In a case where a main power supply is normal when an ignition is turned on, the control unit controls to turn on or off a charging circuit to charge a capacitor from the main power supply so that a voltage of the capacitor becomes constant at a target voltage and turns off the discharging circuit to stop discharging from the capacitor to a first electronic device. In a case where an abnormality occurs in the main power supply when the ignition is turned on, the control unit turns off the charging circuit to stop charging from the main power supply to the capacitor and turns on the discharging circuit to perform discharging from the capacitor to the first electronic device.

8 Claims, 4 Drawing Sheets

FIG. 2

| | | Charging circuit | Discharging circuit | First switch | Second switch | Third switch |
|---|---|---|---|---|---|---|
| Immediately after ignition is turned off up to when electric charges become zero | (A) USE | Charging circuit is turned off | Discharging circuit is turned on | First switch is turned on | Second switch is turned off | Third switch is turned off |
| | (B) NOT USE | Charging circuit is turned off | Discharging circuit is turned off | First switch is turned off | Second switch is turned off | Third switch is turned on |
| (C) After electric charges become zero when ignition is turned off | | Charging circuit is turned off | Discharging circuit is turned off | First switch is turned off | Second switch is turned off | Third switch is turned off |
| (D) When ignition is turned on in normal state | | Charging circuit is repeatedly turned on and off | Discharging circuit is turned off | First switch is turned off | Second switch is turned on | Third switch is turned off |
| (E) When ignition is turned on in abnormal state | | Charging circuit is turned off | Discharging circuit is turned on | First switch is turned off | Second switch is turned off | Third switch is turned off |

FIG. 4

| | | | |
|---|---|---|---|
| (A) IMMEDIATELY AFTER IGNITION IS TURNED OFF UP TO WHEN VOLTAGE REACHES SPECIFIED VALUE | CHARGING CIRCUIT IS TURNED OFF | DISCHARGING CIRCUIT IS TURNED ON | FIRST SWITCH IS TURNED ON | SECOND SWITCH IS TURNED OFF |
| (B) AFTER VOLTAGE REACHES SPECIFIED VALUE WHEN IGNITION IS TURNED OFF | CHARGING CIRCUIT IS TURNED OFF | DISCHARGING CIRCUIT IS TURNED OFF | FIRST SWITCH IS TURNED OFF | SECOND SWITCH IS TURNED ON |
| (C) WHEN IGNITION IS TURNED ON IN NORMAL STATE | CHARGING CIRCUIT IS REPEATEDLY TURNED ON AND OFF | DISCHARGING CIRCUIT IS TURNED OFF | FIRST SWITCH IS TURNED OFF | SECOND SWITCH IS TURNED ON |
| (D) WHEN IGNITION IS TURNED ON IN ABNORMAL STATE | CHARGING CIRCUIT IS TURNED OFF | DISCHARGING CIRCUIT IS TURNED ON | FIRST SWITCH IS TURNED OFF | SECOND SWITCH IS TURNED OFF |

BACKUP POWER-SUPPLY DEVICE

CROSS-REFERENCE TO RELATED APPLICATIONS

This application is based on and claims priority under 35 USC 119 from Japanese Patent Application No. 2021-121843 filed on Jul. 26, 2021, the contents of which are incorporated herein by reference.

TECHNICAL FIELD

The present invention relates to a backup power-supply device.

BACKGROUND ART

In general, a vehicle such as an automobile includes an in-vehicle battery as a main power supply. In addition, the vehicle also includes an alternator (generator) for charging the in-vehicle battery. DC power is supplied from the main power supply to a large number of various electronic devices mounted on each part of the vehicle. The electronic devices in the vehicle are used to implement various functions such as traveling, steering, stopping, door opening/closing, lighting, and communication of the vehicle at all times or as needed, and the electronic devices require power supply.

On the other hand, for example, when components such as an in-vehicle battery, an alternator, and a wire harness are damaged due to a traffic accident or the like, power from the main power supply is cut off, and power cannot be supplied from the main power supply to the electronic devices. In order to avoid deterioration of the situation, it is desirable to continue to supply power to an important electronic device even in a state in which power from the main power supply is cut off. Therefore, a backup power supply is required to replace the main power supply.

A power supply employing an electric double layer capacitor or a lithium ion capacitor has been proposed as a backup power supply (see Patent Literature 1). The electric double layer capacitor is likely to deteriorate when a state in which electric charges are accumulated continues. The lithium ion capacitor is likely to deteriorate when the lithium ion capacitor is left in a fully charged state for a long time.

Therefore, it is considered to discharge the electric double layer capacitor or the lithium ion capacitor by discharge resistance when an ignition is turned off. However, there is a problem that electric charges accumulated in these capacitors are discharged in a waste manner.

CITATION LIST

Patent Literature

Patent Literature 1: JP-A-2020-182317

SUMMARY OF INVENTION

The present invention has been made in view of the above circumstances, and an object of the present invention is to provide a backup power-supply device that effectively use electric charges accumulated in a capacitor.

In order to achieve the above object, a backup power-supply device according to the present invention is characterized by the following feature.

The backup power-supply device includes
a capacitor that is configured to supply power to a first electronic device and is provided as a backup for a main power supply;
a charging circuit that is provided between the main power supply and the capacitor and is configured to turn on and turn off charging from the main power supply to the capacitor;
a discharging circuit that is provided between the capacitor and the first electronic device and is configured to turn on and turn off discharging from the capacitor to the first electronic device;
a control unit that is configured to control to turn on or turn off the charging circuit to charge the capacitor from the main power supply so that a voltage of the capacitor becomes constant at a target voltage and turns off the discharging circuit to stop discharging from the capacitor to the first electronic device in a case where the main power supply is normal when an ignition is turned on, and turns off the charging circuit to stop charging from the main power supply to the capacitor and turns on the discharging circuit to perform discharging from the capacitor to the first electronic device in a case where an abnormality occurs in the main power supply when the ignition is turned on; and
a first switch that is provided between the second electronic device and the capacitor.

The control unit turns on the discharging circuit and the first switch and turns off the charging circuit after the ignition is turned off to perform discharging from the capacitor to the second electronic device and to stop charging from the main power supply to the capacitor.

According to the present invention, it is possible to provide a backup power-supply device that effectively use electric charges accumulated in a capacitor.

The present invention has been briefly described as above. Further, details of the present invention will be clarified by reading an aspect (hereinafter, referred to as an "embodiment") for implementing the invention to be described below with reference to the accompanying drawings.

BRIEF DESCRIPTION OF DRAWINGS

FIG. 2 is a table showing states of a charging circuit, a discharging circuit, and first to third switches shown in FIG. 1.

FIG. 4 is a table showing states of a charging circuit, a discharging circuit, and first and second switches shown in FIG. 3.

DESCRIPTION OF EMBODIMENTS

A specific embodiment according to the present invention will be described below with reference to the accompanying drawings.

First Embodiment

Figure 1:
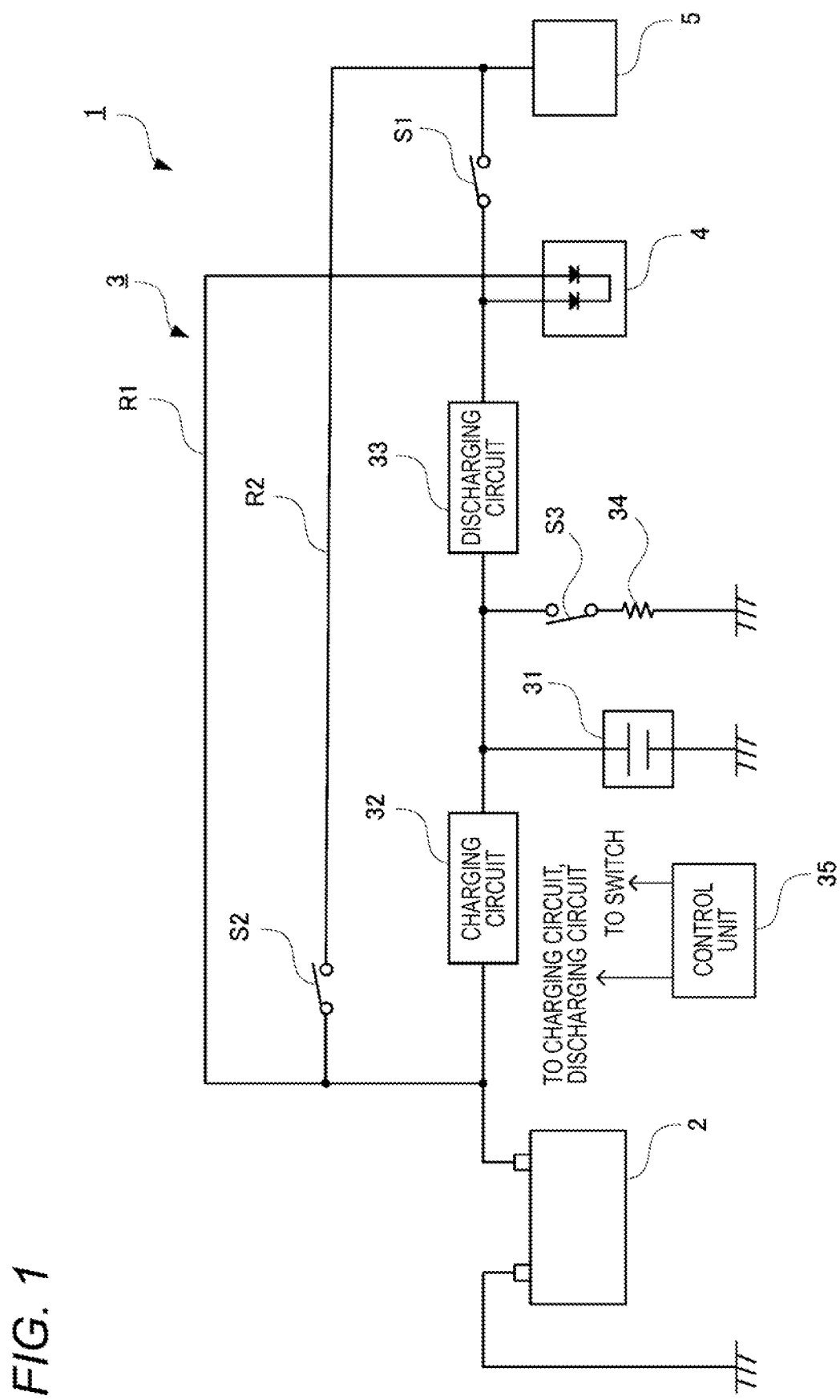
FIG. 1 is a circuit diagram showing an embodiment of a power supply system incorporating a backup power-supply device according to a first embodiment of the present invention.

First, a power supply system 1 incorporating a backup power-supply device 3 according to a first embodiment will be described with reference to FIG. 1. The power supply system 1 according to the present embodiment is mounted on an automobile. As shown in FIG. 1, the power supply system 1 according to the first embodiment includes a main battery 2 serving as a main power supply, the backup power-supply device 3 provided for backing up the main battery 2, a first electronic device 4, and a second electronic device 5 different from the first electronic device 4. The first electronic device 4 and the second electronic device 5 are supplied with power from the main battery 2 and the backup power-supply device 3.

The main battery 2 supplies power to the first electronic device 4 and the second electronic device 5. When power is supplied at the time of turning on an ignition, the first electronic device 4 is operated, and when power supply is cut off at the time of turning off the ignition, it is not necessary to operate the first electronic device 4. The first electronic device 4 is an important device for which it is desired to continue the power supply even when an abnormality occurs in the main battery 2 due to an accident or the like and power cannot be supplied from the main battery 2 to the first electronic device 4.

The second electronic device 5 includes a communication device for communicating with a terminal such as a smartphone, a lighting device, an air cleaner, and the like. It is desired to supply power to the second electronic device 5 and operate the second electronic device 5 for a certain period of time not only when the ignition is turned on, but also after the ignition is turned off.

Next, the backup power-supply device 3 will be described. The backup power-supply device 3 includes an electric double layer capacitor 31 serving as a capacitor, a charging circuit 32, a discharging circuit 33, a conduction path R1, a conduction path R2, a discharge resistor 34, first to third switches S1 to S3, and a control unit 35. The electric double layer capacitor 31 is provided as a backup for the main battery 2. The electric double layer capacitor 31 deteriorates when a state in which electric charges are accumulated continues. Therefore, the electric double layer capacitor 31 is sufficiently charged so that a voltage becomes a target voltage in preparation for a case where an abnormality occurs in the main battery 2 when the ignition is turned on, and is discharged until the voltage becomes zero in order to prevent deterioration when the ignition is turned off.

The charging circuit 32 is provided between a positive pole of the main battery 2 and one end of the electric double layer capacitor 31. A negative pole of the main battery 2 and the other end of the electric double layer capacitor 31 are connected to the ground. The charging circuit 32 can turn on and turn off charging (a power supply) from the main battery 2 to the electric double layer capacitor 31. For example, the charging circuit 32 includes a direct current (DC)/DC converter that steps down or steps up a power supply voltage of the main battery 2 and supplies the stepped-down or stepped-down power supply voltage to the electric double layer capacitor 31 when a voltage of the main battery 2 is higher or lower than a voltage of the electric double layer capacitor 31, and a switch that turns on or turns off a power supply from the main battery 2 to the DC/DC converter (the DC/DC converter and the switch are not shown). When the voltages of the main battery 2 and the electric double layer capacitor 31 are substantially equal to each other, the charging circuit 32 includes only a switch (not shown). Charging from the main battery 2 to the electric double layer capacitor 31 can be turned on or turned off by turning on or turning off the switch provided in the charging circuit 32.

The discharging circuit 33 is provided between one end of the electric double layer capacitor 31 and the first electronic device 4. The discharging circuit 33 can turn on and off discharging (a power supply) from the electric double layer capacitor 31 to the first electronic device 4. For example, the discharging circuit 33 includes a DC/DC converter that steps down or steps up a voltage of the electric double layer capacitor 31 and supplies the stepped-down or stepped-up voltage to the first electronic device 4 when a voltage supplied to the first electronic device 4 is higher or lower than a voltage of the electric double layer capacitor 31, and a switch that turns on or turns off a power supply from the electric double layer capacitor 31 to the DC/DC converter (the DC/DC converter and the switch are not shown). When the voltages of the electric double layer capacitor 31 and the first electronic device 4 are substantially equal to each other, the discharging circuit 33 includes only a switch. Discharging from the electric double layer capacitor 31 to the first electronic device 4 can be turned on or turned off by turning on or turning off the switch provided in the discharging circuit 33. The charging circuit 32 and the discharging circuit 33 described above are controlled by the control unit 35 to be described later.

The conduction path R1 is connected to the first electronic device 4 and the positive pole of the main battery 2, and bypasses the charging circuit 32 and the discharging circuit 33. The conduction path R2 is connected to the second electronic device 5 and the positive pole the main battery 2, and bypasses the charging circuit 32 and the discharging circuit 33. The discharge resistor 34 is connected in parallel with the electric double layer capacitor 31 between the charging circuit 32 and the discharging circuit 33. One end of the discharge resistor 34 is connected to one end of the electric double layer capacitor 31 via the third switch S3 to be described later, and the other end of the discharge resistor 34 is connected to the ground.

The first switch S1 is provided between the second electronic device 5 and the electric double layer capacitor 31. In the present embodiment, the first switch S1 is provided closer to the second electronic device 5 than a connection point between the discharging circuit 33 and the first electronic device 4. When the first switch S1 is turned on, discharging from the electric double layer capacitor 31 to the second electronic device 5 is enabled, and when the first switch S1 is turned off, discharging from the electric double layer capacitor 31 to the second electronic device 5 is cut off.

The second switch S2 is provided on the conduction path R2 that connects the second electronic device 5 and the main battery 2, and is connected in parallel to the first switch S1. When the second switch S2 is turned on, power can be supplied from the main battery 2 to the second electronic device 5, and when the second switch S2 is turned off, power supply from the main battery 2 to the second electronic device 5 is cut off.

The third switch S3 is provided on a discharge path from the electric double layer capacitor 31 to the discharge resistor 34. In the present embodiment, the third switch S3 is connected between one end of the electric double layer capacitor 31 and the discharge resistor 34. More specifically, the electric double layer capacitor 31, and the discharge resistor 34 and the third switch S3 that both are connected in series are connected in parallel between the ground and a connection point of the charging circuit 32 and the discharging circuit 33. When the third switch S3 is turned on, the electric double layer capacitor 31 is discharged by the discharge resistor 34, and when the third switch S3 is turned off, discharging from the electric double layer capacitor 31 to the discharge resistor 34 is cut off. The first to third switches S1 to S3 are controlled to be turned on and turned off by the control unit 35 to be described later.

The control unit 35 is connected to the charging circuit 32, the discharging circuit 33, and the first to third switches S1 to S3 described above, and controls on/off of switches (not shown) included in the charging circuit 32 and the discharging circuit 33, and the first to third switches S1 to S3. The control unit 35 includes, for example, a microcomputer (not shown). The microcomputer includes a memory that stores a program and a central processing unit (CPU) that operates in accordance with the program.

Next, an operation of the power supply system 1 having the above-described configuration will be described with reference to FIG. 2. In the power supply system 1 according to the present embodiment, a user can set in advance whether the second electronic device 5 is used for a certain period of time after the ignition is turned off or is not used after the ignition is turned off. For example, an input unit of a navigation device or communication with a smartphone can be used to make such a setting. Setting contents can be stored in the memory of the control unit 35. That is, the control unit 35 also functions as a storage unit.

Immediately after the ignition is turned off, the control unit 35 determines whether the second electronic device 5 is set to be used for a certain period of time after the ignition is turned off. When the second electronic device 5 is set to be used for a certain period of time after the ignition is turned off, the control unit 35 turns on the switch in the discharging circuit 33 and the first switch S1, and turns off the switch in the charging circuit 32 and the second and third switches S2 and S3, as shown in (A) of FIG. 2.

As a result, charging from the main battery 2 to the electric double layer capacitor 31 and a power supply to the second electronic device 5 are cut off, and the electric double layer capacitor 31 is discharged by the second electronic device 5. When the ignition is turned off, since a switch built in the first electronic device 4 is turned off, discharging from the electric double layer capacitor 31 to the first electronic device 4 is disabled.

On the other hand, when the second electronic device 5 is set to be not used after the ignition is turned off, the control unit 35 turns on the third switch S3, and turns off the switches in the charging circuit 32 and the discharging circuit 33 and the first and second switches S1 and S2, as shown in (B) of FIG. 2. As a result, charging from the main battery 2 to the electric double layer capacitor 31 is cut off. Discharging (a power supply) from the main battery 2 and the electric double layer capacitor 31 to the second electronic device 5 is cut off, power is not supplied to the second electronic device 5 and the second electronic device 5 is not used. The electric double layer capacitor 31 is discharged by the discharge resistor 34.

The control unit 35 detects a voltage of the electric double layer capacitor 31, the electric double layer capacitor 31 is discharged by the second electronic device 5 or the discharge resistor 34, and when the control unit 35 determines that electric charges becomes zero (that is, the electric double layer capacitor 31 is brought into a discharge ending state), the control unit 35 turns off the switches in the charging circuit 32 and the discharging circuit 33 and the first to third switches S1 to S3, as shown in (C) of FIG. 2. That is, when the second electronic device 5 is set to be used after the ignition is turned off, power is supplied to the second electronic device 5 until electric charges of the electric double layer capacitor 31 becomes zero.

When the ignition is tuned on and the main battery 2 is in a normal state in which no abnormality occurs, the control unit 35 repeatedly turns on and off the switch in the charging circuit 32 as shown in (D) of FIG. 2. More specifically, the control unit 35 detects a voltage of the electric double layer capacitor 31, and when the detected voltage reaches a target voltage, the control unit 35 turns off the charging circuit 32 to cut off charging from the main battery 2 to the electric double layer capacitor 31. When natural discharging is performed and the detected voltage of the electric double layer capacitor 31 falls below the target voltage, the control unit 35 turns on the charging circuit 32 to charge the electric double layer capacitor 31 from the main battery 2.

As shown in (D) of FIG. 2, the control unit 35 turns on the second switch S2 and turns off the switch in the discharging circuit 33, the first switch S1, and the third switch S3. As a result, the second electronic device 5 is operated by receiving a power supply from the main battery 2, and discharging from the electric double layer capacitor 31 to the discharge resistor 34 or the second electronic device 5 is cut off. When the ignition is turned on, since the switch built in the first electronic device 4 is turned on, power is supplied from the main battery 2 to the first electronic device 4 via the conduction path R1.

When the ignition is turned on and an abnormality occurs in the main battery 2, the control unit 35 turns on the switch in the discharging circuit 33 and turns off the switch in the charging circuit 32 and the first to third switches S1 to S3, as shown in (E) of FIG. 2. As a result, power can be supplied from the electric double layer capacitor 31 to the first electronic device 4, and a power supply to the first electronic device 4 can be continued even after an abnormality occurs in the main battery 2. In addition, charging from the main battery 2 to the electric double layer capacitor 31 and a power supply from the main battery 2 and the electric double layer capacitor 31 to the second electronic device 5 are cut off.

According to the first embodiment described above, after the ignition is turned off, the control unit 35 turns on the switch in the discharging circuit 33 and the first switch S1 and turns off the switch in the charging circuit 32 to perform discharging from the electric double layer capacitor 31 to the second electronic device 5 and stop charging from the main battery 2 to the electric double layer capacitor 31. As a result, after the ignition is turned off, the electric double layer capacitor 31 can be discharged so as to prevent deterioration, and discharge energy of the electric double layer capacitor 31 can be effectively used as a power supply for the second electronic device 5.

According to the first embodiment described above, the control unit 35 can turn on the second switch S2 to supply power from the main battery 2 to the second electronic device 5 in a normal state in which the main battery 2 is normal when the ignition is turned on. In a case where an abnormality occurs in the main battery 2 when the ignition is turned on, after the ignition is turned off, the control unit 35 turns off the second switch S2 to cut off the power supply from the main battery 2 to the second electronic device 5, and does not cut off discharging from the electric double layer capacitor 31 to the second electronic device 5.

According to the first embodiment described above, after the ignition is turned off, the control unit 35 turns off the second switch S2 to cut off the power supply from the main battery 2 to the second electronic device 5 after electric charges of the electric double layer capacitor 31 becomes zero. As a result, after the ignition is turned off, the second electronic device 5 can be driven for a period of time until when electric charges of the electric double layer capacitor 31 becomes zero.

According to the first embodiment described above, in a case where the second electronic device 5 is set to be used, the control unit 35 turns on the first switch S1 and turns off the third switch S3 after the ignition is turned off, and in a case where the second electronic device 5 is set to be not used, the control unit 35 turns off the second switch S2 and turns on the third switch S3 after the ignition is turned off. As a result, even when the second electronic device 5 is set to be not used, the electric double layer capacitor 31 can be discharged.

Although the electric double layer capacitor 31 is used as a capacitor in the first embodiment described above, the present invention is not limited thereto. A lithium ion capacitor may be used instead of the electric double layer capacitor 31. In this case, the control unit 35 determines that the lithium ion capacitor is brought into a discharge ending state when a voltage of the lithium ion capacitor reaches a specified value.

Although a user can set whether to use or not use the second electronic device 5 after the ignition is turned off in the first embodiment described above, the present invention is not limited thereto. Alternatively, the second electronic device 5 may be constantly used after the ignition is turned off, and it is not necessary to provide the discharge resistor 34 and the third switch S3.

Second Embodiment

Figure 3:
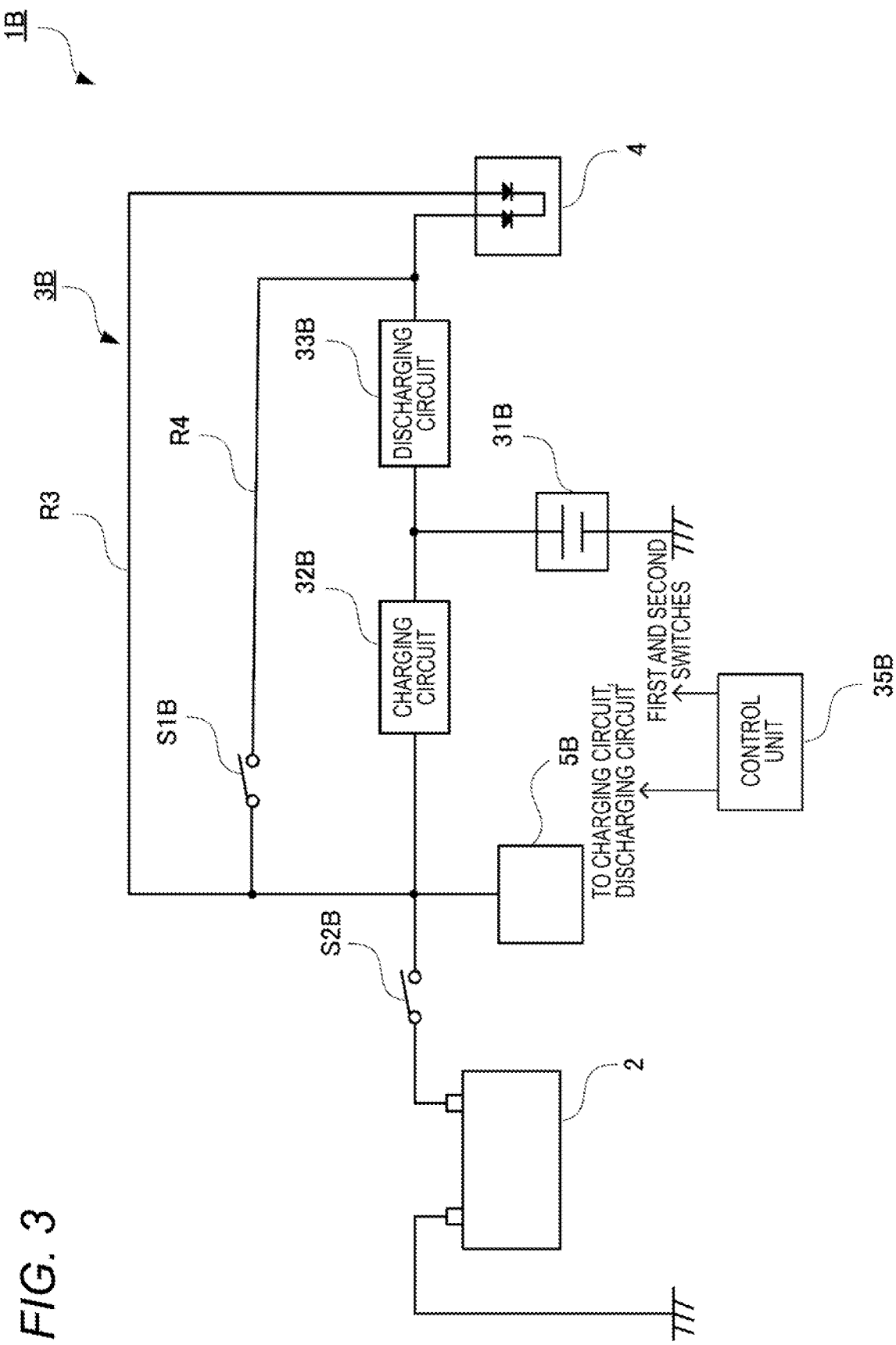
FIG. 3 is a circuit diagram showing an embodiment of a power supply system incorporating a backup power-supply device according to a second embodiment of the present invention.

Next, a power supply system 1B according to a second embodiment will be described with reference to FIG. 3. In FIG. 3, the same components as those of the power supply system 1 shown in FIG. 1 described above in the first embodiment are denoted by the same reference numerals, and detailed description thereof will be omitted. As shown in FIG. 3, the power supply system 1B according to the second embodiment includes the main battery 2, a backup power-supply device 3B provided for backing up the main battery 2, and the first electronic device 4 and a second electronic device 5B that are supplied with power from the main battery 2 and the backup power-supply device 3B.

The main battery 2 supplies power to the first electronic device 4 and the second electronic device 5B. Since the first electronic device 4 is the same as that according to the first embodiment, detailed description thereof will be omitted here. The second electronic device 5B is a device such as a clock, a smart key, or a memory. It is desired to continue to supply power to the second electronic device 5B and operate the second electronic device 5B from when the ignition is turned off to when the ignition is turned on.

Next, the backup power-supply device 3B will be described. The backup power-supply device 3B includes a small lithium ion capacitor 31B serving as a capacitor, a charging circuit 32B, a discharging circuit 33B, first and second switches S1B and S2B, a conduction path R3, a conduction path R4, and a control unit 35B. The small lithium ion capacitor 31B deteriorates when a state of full charge continues. Therefore, the small lithium ion capacitor 31B is sufficiently charged so that a voltage becomes a target voltage in preparation for a case where an abnormality occurs in the main battery 2 when the ignition is turned on, and is discharged until the voltage becomes a specified value lower than the target voltage in order to prevent deterioration when the ignition is turned off.

The charging circuit 32B is provided between the positive pole of the main battery 2 and one end of the small lithium ion capacitor 31B. The negative pole of the main battery 2 and the other end of the small lithium ion capacitor 31B are connected to the ground. The charging circuit 32B can turn on and turn off charging (a power supply) from the main battery 2 to the small lithium ion capacitor 31B.

The discharging circuit 33B is provided between one end of the small lithium ion capacitor 31B and the first electronic device 4. The discharging circuit 33B can turn on and turn off discharging (a power supply) from the small lithium ion capacitor 31B to the first electronic device 4. Since configurations of the charging circuit 32B and the discharging circuit 33B are the same as configurations of the charging circuit 32 and the discharging circuit 33 according to the first embodiment, detailed description thereof will be omitted here.

The conduction path R3 is connected to the first electronic device 4 and the positive pole of the main battery 2, and bypasses the charging circuit 32B and the discharging circuit 33B. The conduction path R4 is connected between the second electronic device 5B and a connection point of the discharging circuit 33B and the first electronic device 4. The second electronic device 5B is connected between the charging circuit 32B and the main battery 2.

The first switch S1B is provided between the second electronic device 5B and the small lithium ion capacitor 31B. More specifically, the conduction path R4 connects the second electronic device 5B and the connection point of the discharging circuit 33B and the first electronic device 4. The small lithium ion capacitor 31B is connected to the second electronic device 5B by the conduction path R4 via the discharging circuit 33B. The first switch S1B is provided on the conduction path R4. When the first switch S1B is turned on, power is supplied from the small lithium ion capacitor 31B to the second electronic device 5B, and when the first switch S1B is turned off, the power supply from the small lithium ion capacitor 31B to the second electronic device 5B is cut off.

The second switch S2B is provided between the second electronic device 5B and the main battery 2. When the second switch S2B is turned on, power is supplied from the main battery 2 to the first electronic device 4 and the second electronic device 5B, and when the second switch S2B is turned off, the power supply from the main battery 2 to the first electronic device 4 and the second electronic device 5B is cut off.

Next, an operation of the power supply system 1B having the above-described configuration will be described with reference to FIG. 4. Immediately after the ignition is turned off, the control unit 35B turns on a switch in the discharging circuit 33B and the first switch S1B, and turns off a switch in the charging circuit 32B and the second switch S2B, as shown in (A) of FIG. 4.

Accordingly, charging from the main battery 2 to the small lithium ion capacitor 31B and a power supply to the first electronic device 4 and the second electronic device 5B are cut off, and discharging from the small lithium ion capacitor 31B to the second electronic device 5B is performed. When the ignition is turned off, since the switch built in the first electronic device 4 is turned off, discharging from the small lithium ion capacitor 31B to the first electronic device 4 is not performed.

Thereafter, when the small lithium ion capacitor 31B is discharged and a voltage of the small lithium ion capacitor 31B reaches a specified value (the small lithium ion capacitor 31B is brought into a discharge ending state), the control unit 35B turns on the second switch S2B, and turns off the switches in the charging circuit 32B and the discharging circuit 33B and the first switch S1B, as shown in (B) of FIG. 4. As a result, the power supply from the main battery 2 to the second electronic device 5B is continued.

On the other hand, when the ignition is turned on and the main battery 2 is in a normal state in which no abnormality occurs, the control unit 35B repeatedly turns on and off the switch in the charging circuit 32B as shown in (C) of FIG. 4. Specifically, the control unit 35B detects a voltage of the small lithium ion capacitor 31B, and when the detected voltage reaches a target voltage, the control unit 35B turns off the charging circuit 32B to cut off charging from the main battery 2 to the small lithium ion capacitor 31B. On the other hand, when natural discharging is performed and the detected voltage falls below the target voltage, the control unit 35B turns on the charging circuit 32B to charge the small lithium ion capacitor 31B from the main battery 2.

As shown in (C) of FIG. 4, the control unit 35B turns on the second switch S2B, and turns off the switch in the discharging circuit 33B and the first switch S1B. As a result, the second electronic device 5B is operated by receiving a power supply from the main battery 2, and discharging from the small lithium ion capacitor 31B to the second electronic device 5B is cut off. When the ignition is turned on, since the switch built in the first electronic device 4 is turned on, power is supplied from the main battery 2 to the first electronic device 4.

When the ignition is turned on and an abnormality occurs in the main battery 2, the control unit 35B turns on the switch in the discharging circuit 33b, and turns off the switch in the charging circuit 32b and the first and second switches S1B and S2B, as shown in (D) of FIG. 4. As a result, power can be supplied from the small lithium ion capacitor 31 to the first electronic device 4, and a power supply to the first electronic device 4 can be continued even after an abnormality occurs in the main battery 2. In addition, charging from the main battery 2 to the small lithium ion capacitor 31B and a power supply to the second electronic device 5B are cut off.

According to the second embodiment described above, after the ignition is turned off, the control unit 35B turns on the switch in the discharging circuit 33B and the first switch S1B and turns off the switch in the charging circuit 32B to perform discharging from the small lithium ion capacitor 31B to the second electronic device 5B and stop charging from the main battery 2 to the small lithium ion capacitor 31B. As a result, after the ignition is turned off, the small lithium ion capacitor 31B can be discharged so as to prevent deterioration, and discharge energy of the small lithium ion capacitor 31B can be effectively used as a power supply for the second electronic device 5B.

According to the second embodiment described above, the control unit 35B can turn on the second switch S2B to supply power from the main battery 2 to the second electronic device 5B in a normal state in which the main battery 2 is normal when the ignition is turned on. In a case where an abnormality occurs in the main battery 2 when the ignition is turned on, after the ignition is turned off, the control unit 35B turns off the second switch S2B to cut off the power supply from the main battery 2 to the second electronic device 5B, and does not cut off discharging from the small lithium ion capacitor 31B to the second electronic device 5B.

According to the second embodiment described above, the control unit 35B turns on the second switch S2B to supply power from the main battery 2 to the second electronic device 5B after a voltage of the small lithium ion capacitor 31B reaches the specified value after the ignition is turned off. As a result, after the ignition is turned off, the second electronic device 5B can be driven even after the voltage of the small lithium ion capacitor 31B reaches the specified value.

Although the small lithium ion capacitor 31B is used as a capacitor in the second embodiment described above, the present invention is not limited thereto. An electric double layer capacitor may be used instead of the small lithium ion capacitor 31B. In this case, the control unit 35B determines that the electric double layer capacitor is brought into a discharge ending state when electric charges of the electric double layer capacitor becomes zero.

The present invention is not limited to the embodiments described above, and modifications, improvements, and the like can be made as appropriate. In addition, materials, shapes, dimensions, numbers, arrangement locations and the like of elements in the above embodiments are optional and are not limited as long as the object of the present invention can be achieved.

Here, features of the embodiments of the backup power-supply device according to the present invention described above will be briefly summarized and listed in the following [1] to [6].

[1] A backup power-supply device (3, 3B) including:
  a capacitor (31, 31B) provided as a backup for a main power supply (2) that supplies power to a first electronic device (4);
  a charging circuit (32, 32B) that is provided between the main power supply (2) and the capacitor (31, 31B) and configured to turn on and turn off charging from the main power supply (2) to the capacitor (31, 31B);
  a discharging circuit (33, 33B) that is provided between the capacitor (31, 31B) and the first electronic device (4) and configured to turn on and turn off discharging from the capacitor (31, 31B) to the first electronic device (4);
  a control unit (35, 35B) that controls to turn on or turn off the charging circuit (32, 32B) to charge the capacitor (31, 31B) from the main power supply (2) so that a voltage of the capacitor (31, 31B) becomes constant at a target voltage and turns off the discharging circuit (33, 33B) to stop discharging from the capacitor (31, 31B) to the first electronic device (4) in a case where the main power supply (2) is normal when an ignition is turned on, and turns off the charging circuit (32, 32B) to stop charging from the main power supply (2) to the capacitor (31, 31B) and turns on the discharging circuit (33, 33B) to perform discharging from the capacitor (31, 31B) to the first electronic device (4) in a case where an abnormality occurs in the main power supply (2) when the ignition is turned on; and
  a first switch (S1, S1B) provided between the second electronic device (5, 5B) and the capacitor (31, 31B), in which
  the control unit (35, 35B) turns on the discharging circuit (33, 33B) and the first switch (S1, S1B) and turns off the charging circuit (32, 32B) after the ignition is turned off to perform discharging from the capacitor (31, 31B) to the second electronic device (5, 5B) and stop charging from the main power supply (2) to the capacitor (31, 31B).

According to the configuration of the above [1], after the ignition is turned off, the capacitor (31, 31B) can be discharged so as to prevent deterioration, and the discharge energy of the capacitor (31, 31B) can be effectively used as a power supply for the second electronic device (5, 5B).

[2] The backup power-supply device (3, 3B) according to [1], further including:
a second switch (S2, S2B) provided between the second electronic device (5, 5B) and the main power supply (2), in which
the control unit (35, 35B) turns on the second switch (S2, S2B) to supply power from the main power supply (2) to the second electronic device (5, 5B) in a case where the main power supply (2) is normal when the ignition is turned on, and turns off the second switch (S2, S2B) to cut off the power supply from the main power supply (2) to the second electronic device (5, 5B) after the ignition is turned off in a case where an abnormality occurs in the main power supply (2) when the ignition is turned on.

According to the configuration of the above [2], the control unit (35, 35B) can turn on the second switch (S2, S2B) to supply power from the main power supply (2) to the second electronic device (5, 5B) in a normal state in which the main power supply (2) is normal when the ignition is turned on. In a case where an abnormality occurs in the main power supply (2) when the ignition is turned on, after the ignition is turned off, the control unit (35, 35B) turns off the second switch (S2, S2B) to cut off the power supply from the main power supply (2) to the second electronic device (5, 5B), and does not cut off discharging from the capacitor (31, 31B) to the second electronic device (5, 5B).

[3] The backup power-supply device (3) according to [2], in which
the control unit (35) turns off the second switch (S2) and continues to cut off the power supply from the main power supply (2) to the second electronic device (5) after the capacitor (31) is brought into a discharge ending state after the ignition is turned off.

According to the configuration of the above [3], the control unit (35) turns off the second switch (S2) to cut off the power supply from the main power supply (2) to the second electronic device (5) after the capacitor (31) is brought into the discharge ending state after the ignition is turned off. As a result, after the ignition is turned off, the second electronic device (5) can be driven for a period of time until when the capacitor 31 is brought into the discharge ending state.

[4] The backup power-supply device (3B) according to [2], in which
the control unit (35B) turns on the second switch (S2B) to start to supply power from the main power supply (2) to the second electronic device (5B) after the capacitor (31B) is brought into a discharge ending state after the ignition is turned off.

According to the configuration of the above [4], the control unit (35B) turns on the second switch (S2B) to supply power from the main power supply (2) to the second electronic device (5B) after the capacitor (31B) is brought into the discharge ending state after the ignition is turned off. As a result, after the ignition is turned off, the second electronic device (5B) can be driven even after the capacitor (31B) is brought into the discharge ending state.

[5] The backup power-supply device (3) according to [3], further including:
a discharge resistor (34) configured to discharge the capacitor (31);
a third switch (S3) provided between the capacitor (31) and the discharge resistor (34); and a storage unit (35) that stores a setting as to whether to use the second electronic device (5) after the ignition is turned off, in which
the control unit (35) turns on the first switch (S1) and turns off the third switch (S3) after the ignition is turned off in a case where the second electronic device (5) is set to be used, and turns off the second switch (S2) and turns on the third switch (S3) after the ignition is turned off in a case where the second electronic device (5) is set to be not used.

According to the configuration of the above [5], in a case where the second electronic device (5) is set to be used, the control unit (35) turns on the first switch (S1) and turns off the third switch (S3) after the ignition is turned off, and in a case where the second electronic device (5) is set to be not used, the control unit (35) turns off the second switch (S2) and turns on the third switch (S3) after the ignition is turned off. As a result, even when the second electronic device (5) is set to be not used, the capacitor (31) can be discharged.

[6] The backup power-supply device (3, 3B) according to any one of [1] to [5], in which
the capacitor is formed of one of an electric double layer capacitor (31) and a lithium ion capacitor (31B).

According to the configuration of the above [6], the electric double layer capacitor (31) and the lithium ion capacitor (31B) can be effectively used.

What is claimed is:

1. A backup power-supply device comprising:
a capacitor that is configured to supply power to a first electronic device and is provided as a backup for a main power supply;
a charging circuit that is provided between the main power supply and the capacitor and is configured to turn on and turn off charging from the main power supply to the capacitor;
a discharging circuit that is provided between the capacitor and the first electronic device and is configured to turn on and turn off discharging from the capacitor to the first electronic device;
a control unit that is configured to control to turn on or turn off the charging circuit to charge the capacitor from the main power supply so that a voltage of the capacitor becomes constant at a target voltage and turns off the discharging circuit to stop discharging from the capacitor to the first electronic device in a case where the main power supply is normal when an ignition is turned on, and turns off the charging circuit to stop charging from the main power supply to the capacitor and turns on the discharging circuit to perform discharging from the capacitor to the first electronic device in a case where an abnormality occurs in the main power supply when the ignition is turned on; and
a first switch that is provided between a second electronic device and the capacitor,
wherein the control unit turns on the discharging circuit and the first switch and turns off the charging circuit after the ignition is turned off to perform discharging from the capacitor to the second electronic device and to stop charging from the main power supply to the capacitor.

2. The backup power-supply device according to claim 1, further comprising:
a second switch that is provided between the second electronic device and the main power supply,
wherein the control unit turns on the second switch to supply power from the main power supply to the second electronic device in a case where the main power supply is normal when the ignition is turned on, and turns off the second switch to cut off the power supply from the main power supply to the second electronic device after the ignition is turned off in a case where an abnormality occurs in the main power supply when the ignition is turned on.

3. The backup power-supply device according to claim 2, wherein the control unit turns off the second switch and continues to cut off the power supply from the main power supply to the second electronic device after the capacitor is brought into a discharge ending state after the ignition is turned off.

4. The backup power-supply device according to claim 3, further comprising:
- a discharge resistor that is configured to discharge the capacitor;
- a third switch that is provided between the capacitor and the discharge resistor; and
- a storage unit that stores a setting as to whether to use the second electronic device after the ignition is turned off,
- wherein in a case where the second electronic device is set to be used, the control unit turns on the first switch and turns off the third switch after the ignition is turned off, and in a case where the second electronic device is set to be not used, the control unit turns off the second switch and turns on the third switch after the ignition is turned off.

5. The backup power-supply device according to claim 2, wherein the control unit turns on the second switch to start to supply power from the main power supply to the second electronic device after the capacitor is brought into a discharge ending state after the ignition is turned off.

6. The backup power-supply device according to claim 1, wherein the capacitor is constructed of one of an electric double layer capacitor and a lithium ion capacitor.

7. The backup power-supply device according to claim 1, wherein the discharging circuit comprises a DC/DC converter and a switch.

8. The backup power-supply device according to claim 1, further comprising:
- a second switch that is provided between the second electronic device and the main power supply;
- a discharge resistor that is configured to discharge the capacitor;
- a third switch that is provided between the capacitor and the discharge resistor; and
- a storage unit that stores a setting as to whether to use the second electronic device after the ignition is turned off,
- wherein in a case where the second electronic device is set to be used, the control unit turns on the first switch and turns off the third switch after the ignition is turned off, and in a case where the second electronic device is set to be not used, the control unit turns off the second switch and turns on the third switch after the ignition is turned off.

* * * * *